United States Patent
Delahaye et al.

(10) Patent No.: US 11,859,508 B2
(45) Date of Patent: Jan. 2, 2024

(54) AIRCRAFT TURBOSHAFT ENGINE COMPRESSOR COMPRISING A DEVICE FOR IMMOBILISING A RETAINING ANNULUS

(71) Applicant: SAFRAN AIRCRAFT ENGINES, Paris (FR)

(72) Inventors: Thomas Nolwenn Emmanuel Delahaye, Moissy-Cramayel (FR); Blaise Bergon, Moissy-Cramayel (FR); Laurent Jablonski, Moissy-Cramayel (FR); Lilian Yann Dumas, Moissy-Cramayel (FR); Thomas Etienne Camille Marie Van De Kerckhove, Moissy-Cramayel (FR); Noël Joseph Camille Robin, Moissy-Cramayel (FR); Guillaume Sevi, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 19 days.

(21) Appl. No.: 17/628,523

(22) PCT Filed: Jul. 10, 2020

(86) PCT No.: PCT/EP2020/069474
§ 371 (c)(1),
(2) Date: Jan. 19, 2022

(87) PCT Pub. No.: WO2021/023470
PCT Pub. Date: Feb. 11, 2021

(65) Prior Publication Data
US 2022/0251975 A1 Aug. 11, 2022

(30) Foreign Application Priority Data
Aug. 6, 2019 (FR) ..................... 1908992

(51) Int. Cl.
*F01D 25/24* (2006.01)
*F01D 9/04* (2006.01)

(52) U.S. Cl.
CPC .......... *F01D 25/246* (2013.01); *F01D 9/042* (2013.01); *F05D 2220/323* (2013.01);
(Continued)

(58) Field of Classification Search
CPC .......... F01D 25/24; F01D 25/246; F01D 9/02; F01D 9/04; F01D 9/041; F01D 9/042;
(Continued)

(56) References Cited

U.S. PATENT DOCUMENTS

2015/0044032 A1* 2/2015 Paradis ................. F01D 9/042
415/209.2
2015/0300205 A1* 10/2015 Willett .................. F01D 9/041
403/375

(Continued)

FOREIGN PATENT DOCUMENTS

EP 1998006 A2 12/2008
EP 2372097 A2 10/2011
(Continued)

OTHER PUBLICATIONS

Search Report from the French Intellectual Property Office on corresponding FR application (FR1908992) dated Jan. 17, 2020.
(Continued)

*Primary Examiner* — Elton K Wong
(74) *Attorney, Agent, or Firm* — KOS IP Law LLP

(57) ABSTRACT

Disclosed is a compressor of a dual-flow aircraft turboshaft engine extending longitudinally along an axis X, the compressor comprising a low-pressure compressor, a high-pressure compressor and an intermediate casing axially connecting the low-pressure compressor and the high-pressure compressor, the high-pressure compressor comprising an
(Continued)

inlet guide stator comprising a retaining ring, an outer high-pressure compressor casing and a plurality of vanes, the compressor comprising an immobilising device comprising at least one first member secured to the intermediate casing and at least one second member secured to the retaining ring and configured to cooperate with the first member in order to prevent tangential movement while allowing axial movement and radial movement of the retaining ring relative to the intermediate casing according to the axis X.

19 Claims, 7 Drawing Sheets

(52) U.S. Cl.
CPC ...... *F05D 2240/12* (2013.01); *F05D 2240/14* (2013.01); *F05D 2260/30* (2013.01)

(58) Field of Classification Search
CPC ............. F05D 2260/30; F05D 2240/12; F05D 2240/14; F05D 2220/323
See application file for complete search history.

(56) References Cited

U.S. PATENT DOCUMENTS

| | | | |
|---|---|---|---|
| 2017/0191500 A1* | 7/2017 | Lobocki | F02C 7/04 |
| 2017/0298741 A1* | 10/2017 | Charbonnier | F01D 25/162 |
| 2020/0318833 A1* | 10/2020 | McCaffrey | F01D 25/26 |

FOREIGN PATENT DOCUMENTS

| | | |
|---|---|---|
| EP | 2412923 A2 | 2/2012 |
| WO | WO 2014/052800 A1 | 4/2014 |

OTHER PUBLICATIONS

International Search Report and Written Opinion on corresponding PCT application (PCT/EP2020/069474) from International Searching Authority (EPO) dated Oct. 14, 2020.

* cited by examiner

AIRCRAFT TURBOSHAFT ENGINE COMPRESSOR COMPRISING A DEVICE FOR IMMOBILISING A RETAINING ANNULUS

TECHNICAL FIELD

The present invention relates to the field of aircraft dual-flow turboshaft engines and is aimed more particularly at an aircraft turboshaft engine compressor with improved resistance to foreign body ingestion.

BACKGROUND

In a known manner, with reference to FIG. 1, an aircraft turboshaft engine 100 extends along a longitudinal axis X and enables an aircraft to be propelled from the acceleration of an incoming air flow in the turboshaft engine 100 and circulating from upstream to downstream. Hereinafter, the terms "upstream" and "downstream" are defined with respect to the longitudinal axis X oriented from upstream to downstream. Similarly, the terms "internal" and "external" are defined along the radial direction with respect to the longitudinal axis X.

In a known manner, with reference to FIG. 1, an aircraft dual-flow turboshaft engine 100 comprises a radially internal primary vein 101 in which a first part of the incoming air flow circulates, called primary air flow, and a radially external secondary vein 102 in which a second part of the incoming air flow, called secondary air flow, circulates.

In a known manner, with reference to FIG. 1, such a turboshaft engine 100 comprises from upstream to downstream an air intake comprising a fan 103 for directing the incoming air flow 25 towards the primary vein 101 and the secondary vein 102, a compressor 104 for compressing the primary air flow, a combustion chamber 105 and a turbine 106.

In a known manner, with reference to FIG. 1, the compressor 104 comprises a low pressure compressor 110 located upstream, a high pressure compressor 130 located downstream and an intermediate casing 120 axially connecting the low pressure compressor 110 and the high pressure compressor 130.

In practice, with reference to FIG. 2 representing a close-up view A1 of FIG. 1, the intermediate casing 120 comprises an internal shell 121 internally delimiting the primary vein 101, an external shell 122 externally delimiting the primary vein 101 and support arms 123 extending between the internal shell 121 and the external shell 122.

Still with reference to FIG. 2, the high pressure compressor 130 comprises alternating stators 131, also called straighteners, and rotors 132 axially mounted along the axis X to respectively guide and accelerate the primary air flow. In a known manner, the stator located furthest upstream of the high pressure compressor 130 is referred to as the "inlet guide wheel 133" and is known to the person skilled in the art by its abbreviation "IGW". The high pressure compressor 130 further comprises an external casing 135 externally delimiting the primary vein 101.

In a known manner, with reference to FIG. 2, the inlet guide wheel 133 comprises a retaining annulus 134 of axis X internally delimiting the primary vein 101 and a plurality of vanes 138 mounted between the retaining annulus 134 and the external casing 135 of the high pressure compressor 130. In practice, the retaining annulus 134 and the external casing 135 respectively comprise a plurality of internal recesses 136 and a plurality of external recesses 137, formed respectively at their external periphery, for mounting the vanes 138. In this example, the inlet guide wheel 133 comprises a vane shimming system 139 for adapting the orientation of the vanes 138 depending on the flight conditions. Such an intermediate casing 120 and such a high pressure compressor 130 are for example known from patent FR2936560B1.

In fact, during the flight of the aircraft, particularly during the take-off and landing phases, the fan 103 generates a suction phenomenon likely to cause ingestion of foreign bodies, especially birds, into the compressor 104. Such ingestion is likely to generate a mechanical moment about the axis X on the inlet guide wheel 133, which may damage the vanes 138 of the inlet guide wheel 133, and in some cases lead to a malfunction of the turboshaft engine 100.

To avoid this phenomenon, it is known in prior art to fixedly mount the inlet guide wheel 133, in the manner of an embedding, on the intermediate casing 120. In other words, the inlet guide wheel 133 cannot move radially, tangentially and axially with respect to the intermediate casing 120.

This solution, while effective, however creates a hyperstatic connection between the intermediate casing 120 and the inlet guide wheel 133, which causes friction and thus premature wear between the intermediate casing 120 and the inlet guide wheel 133. To avoid this friction, one solution is to increase the mounting clearances, but this affects the performance of the turboshaft engine 100. Furthermore, this solution makes it more difficult to disassemble the high pressure compressor 104 in the event of maintenance and to adjust the vane shimming system 139.

The invention thus aims to prevent damage to the vanes of the inlet guide wheel 5 upon ingestion of foreign bodies, without reducing the performance of the turboshaft engine and without modifying the overall structure of the inlet guide wheel and the intermediate casing.

A sealing mechanism for connecting the intermediate casing and the inlet guide wheel of the high pressure compressor of an aircraft turboshaft engine is known from patent application EP1998006A2. Document WO2014052800 A1 relates to a stator assembly of an aircraft turboshaft engine comprising a system for blocking the external platforms of the stator vanes with respect to the casing. Document EP2372097 A2 relates to an aircraft turboshaft engine turbine comprising a radially internal support on which are mounted stator sectors comprising an internal platform and an external platform connected by radial vanes.

SUMMARY

To this end, the invention relates to an aircraft dual-flow turboshaft engine compressor longitudinally extending along an axis X oriented from upstream to downstream, said compressor comprising a low pressure compressor located upstream, a high pressure compressor located downstream and an intermediate casing axially connecting the low pressure compressor and the high pressure compressor, said compressor comprising a primary vein in which a primary air flow accelerated by said compressor circulates from upstream to downstream, said high pressure compressor comprising an inlet guide wheel comprising a retaining annulus internally delimiting the primary vein, an external high pressure compressor casing externally delimiting said primary vein, and a plurality of vanes extending into said primary vein between the retaining annulus and the external high pressure compressor casing, The invention is remarkable in that the compressor comprises a blocking device comprising at least a first member integral with the intermediate casing and at least a second member integral with the retaining annulus and configured to cooperate with the first member in order to block a tangential movement of the retaining annulus with respect to the intermediate casing along the axis X while allowing axial movement and radial movement of said retaining annulus with respect to said intermediate casing along the axis X.

By virtue of the invention, in case of ingestion of a foreign body, the retaining annulus is advantageously protected against any tangential motion, thus avoiding any loss of vanes of the inlet guide wheel. The intermediate casing is a robust element which is advantageously able to resist a tangential load received by the retaining annulus. In addition, such a blocking device allows axial movement and radial movement of the retaining annulus with respect to the intermediate casing, thus avoiding hyperstatics and associated performance losses. Further, radial expansion of the retaining annulus remains possible under the effect of heat. By virtue of the invention, the turboshaft engine has optimal performance and improved resistance upon ingestion of a foreign body.

Preferably, the intermediate casing comprises an internal shell internally delimiting the primary vein and an external shell externally delimiting said primary vein and connected to the external high pressure compressor casing. The first member is integral with the internal shell, in particular with a downstream part of the internal shell.

Advantageously, this allows the first member to extend in proximity to the retaining annulus, thereby limiting its size and mass. Further, the internal shell is a robust member which is advantageously able to resist a tangential load received by the retaining annulus.

Preferably, the first member extends axially protruding downstream. Such a first member allows tangential blocking while leaving axial and radial freedom. Such a first member further has a simple design, which limits its mass and overall size.

According to one aspect of the invention, the second member is in the form of a housing extending axially downstream into the retaining annulus and configured to receive the first member, preferably by interlocking. Advantageously, the first member 25 and the second member cooperate in a form-fitting manner to make a dog connection.

Preferably, the second member has a U-shape defining two side legs and a base. The concavity of the U is radially inwardly oriented so as to allow the retaining annulus to expand radially outwards due to thermal conditions.

Preferably, the internal shell comprises a downstream part comprising a first radial wall, an internal second radial wall located downstream of the first radial wall and radially internal to said first radial wall, and a third axial wall connecting the first radial wall and the second radial wall. The first radial wall and the third axial wall together form a concavity in which the first member is mounted. By "radial" and "axial" it is meant substantially radial and substantially axial.

Advantageously, mounting the first member in a concavity allows the first member to be integral with the first radial wall on the one hand and the third axial wall on the other hand, thereby increasing its mechanical strength. This is particularly advantageous for resisting a tangential load to block the retaining annulus.

According to one aspect of the invention, the first member comprises a median volume defining two side faces configured to form tangential stop faces with the second member. Preferably, the side faces are planar to improve transmission of loads at the stop position.

Preferably, the retaining annulus comprising an upstream annular ring, the second member is formed in the annular ring. Thus, the second member is conveniently made by simply cutting the annular ring. Preferably, the annular ring extends transversely to the axis X. More preferably, the legs of the U, which is the shape of the second member, extend radially protruding inward with respect to the annular ring. This increases the tangential contact and thus the transmission of blocking loads.

Preferably, the first member and the intermediate casing form a one-piece assembly. Preferably, the first member is made of the material of the internal shell, thereby improving mechanical strength and reducing manufacturing cost.

Preferably, the second member and the retaining annulus form a one-piece assembly. Preferably, the second member is made of the material of the retaining annulus, thereby improving mechanical strength and reducing manufacturing cost.

Preferably, the compressor comprises a plurality of first members, preferably at least 3, preferably at most 6. Still preferably, the compressor comprises a plurality of second blocking members, preferably at least 3, preferably at most 6. This advantageously allows the tangential blocking to be distributed and redundant.

According to one aspect of the invention, the intermediate casing comprises a plurality of support arms extending into the primary vein and connecting the internal shell and external shell. At least a first member is located at the same angular position as a support arm with respect to the axis X, preferably each first member is located at the same angular position as a support arm with respect to the axis X.

Advantageously, the first member is positioned in proximity to a support arm in order to benefit from its robustness and thus better block any tangential loads. In addition, the vicinity of the support arm forms a pool of material from which a first member can be formed without restriction.

According to one aspect of the invention, the second member comprises at least an upstream protruding portion that is tangentially offset from the first member and configured to form a tangential stop. Thus, the first member and the second member have similar shapes, which facilitates the design. Further, a protruding portion enables improvement of mechanical strength.

Preferably, the first member is configured to cooperate tangentially with two second members, in particular, one for each direction of rotation about the axis X.

The invention also relates to an aircraft dual-flow turboshaft engine longitudinally extending along an axis X oriented from upstream to downstream and comprising a compressor, as set forth above.

The invention further relates to a method for mounting a compressor as previously described, wherein the retaining annulus is axially mounted to the intermediate casing such that the first member and the second member cooperate to block tangential movement of the retaining annulus with respect to the intermediate casing along the axis X while allowing axial movement and radial movement of said retaining annulus with respect to said intermediate casing along the axis X.

BRIEF DESCRIPTION OF THE DRAWINGS

The invention will be better understood upon reading the following description, given solely by way of example, and referring to the appended drawings given as non-limiting examples, in which identical references are given to similar objects and in which.

It should be noted that the figures disclose the invention in detail for implementing the invention, said figures can of course be used to better define the invention if necessary.

DETAILED DESCRIPTION

Figure 1:
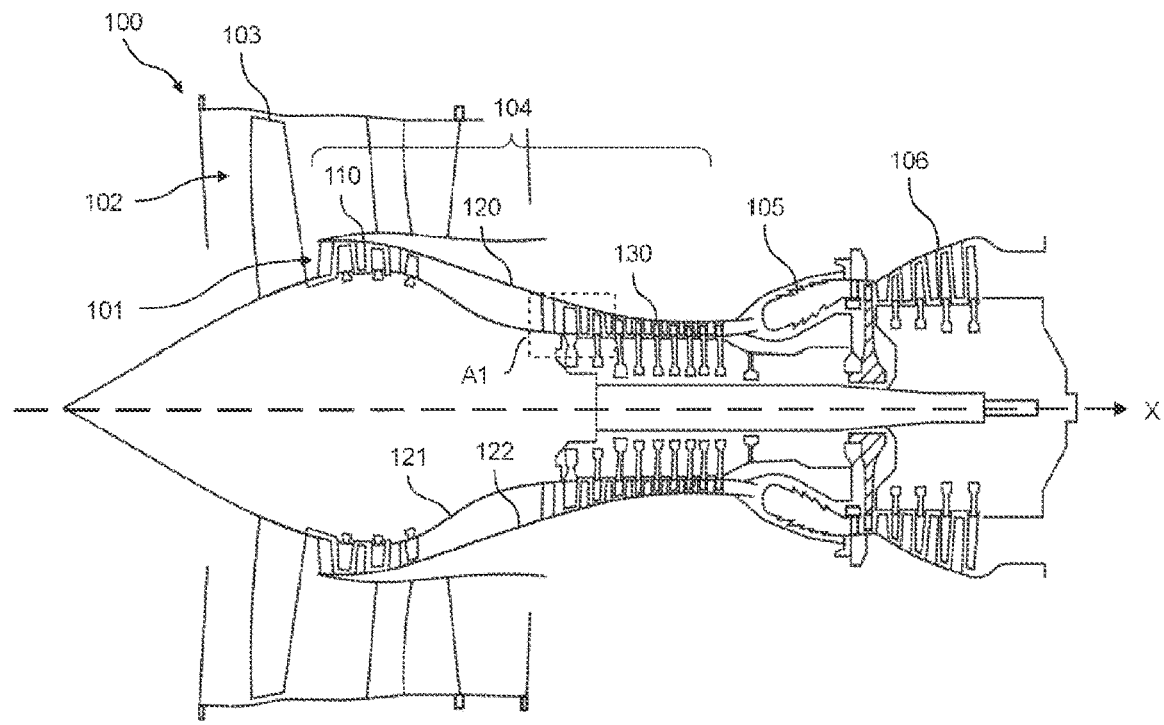
FIG. 1 is a schematic longitudinal cross-section representation of an aircraft turboshaft engine according to prior art.
Figure 2:
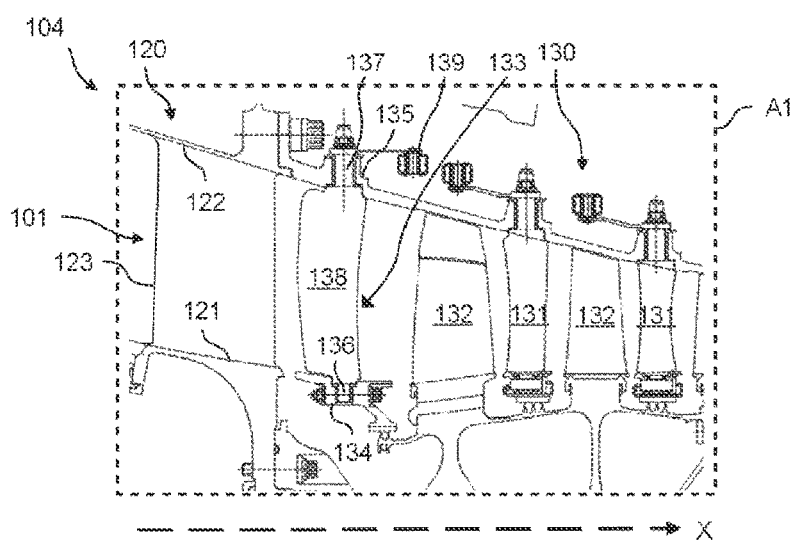
FIG. 2 is a close-up schematic representation of the compressor of the aircraft turboshaft engine of FIG. 1.
Figure 3:
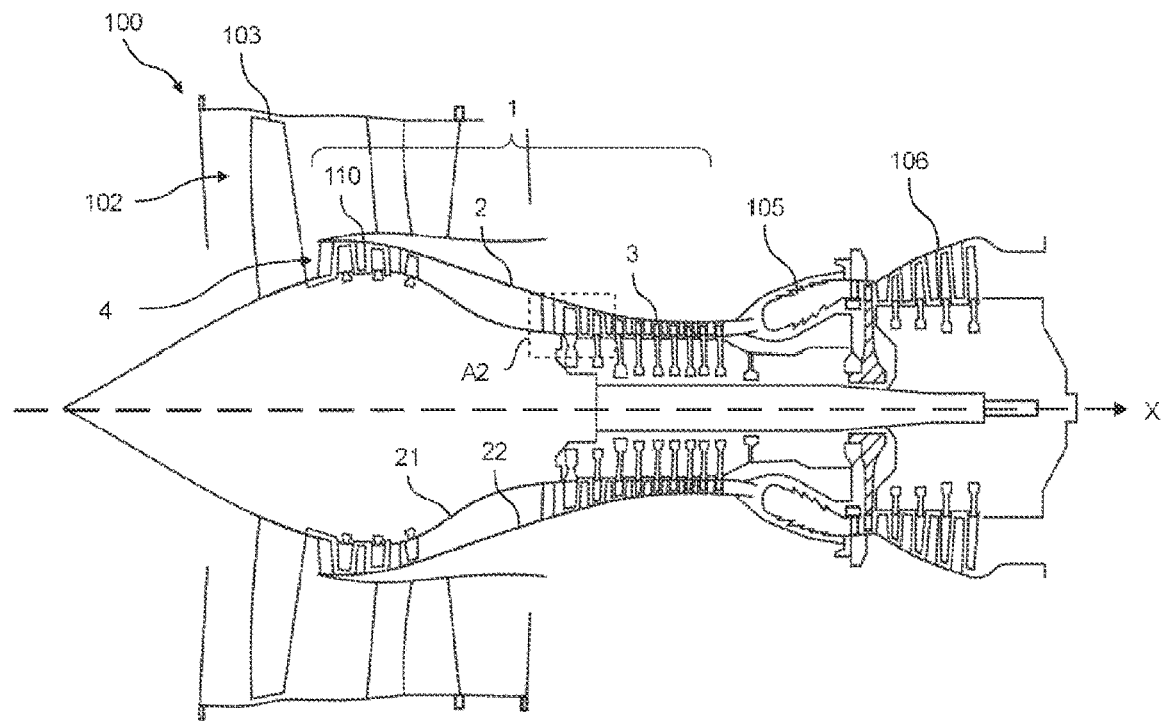
FIG. 3 is a schematic longitudinal cross-section representation of an aircraft turboshaft engine according to the invention.

In a known manner, with reference to FIG. 3, an aircraft turboshaft engine 100 extends along a longitudinal axis X and enables an aircraft to be propelled from the acceleration of an incoming air flow in the turboshaft engine 100 and circulating from upstream to downstream. Hereinafter, the terms "upstream" and "downstream" are defined with respect to the longitudinal axis X oriented from upstream to downstream. Similarly, the terms "internal" and "external" are defined along the radial direction with respect to the longitudinal axis X.

In a known manner, with reference to FIG. 3, an aircraft dual-flow turboshaft engine 100 comprises a radially internal primary vein 4 in which a first part of the incoming air flow, called primary air flow, circulates and a radially external secondary vein 102 in which a second part of the incoming air flow, called secondary air flow, circulates.

In a known manner, with reference to FIG. 3, an aircraft dual-flow turboshaft engine 100 comprises, from upstream to downstream, an air intake comprising a fan 103 for directing the incoming air flow towards the primary vein 4 and the secondary vein 102, a compressor 1 for compressing the primary air flow, a combustion chamber 105 and a turbine 106.

Figure 4:
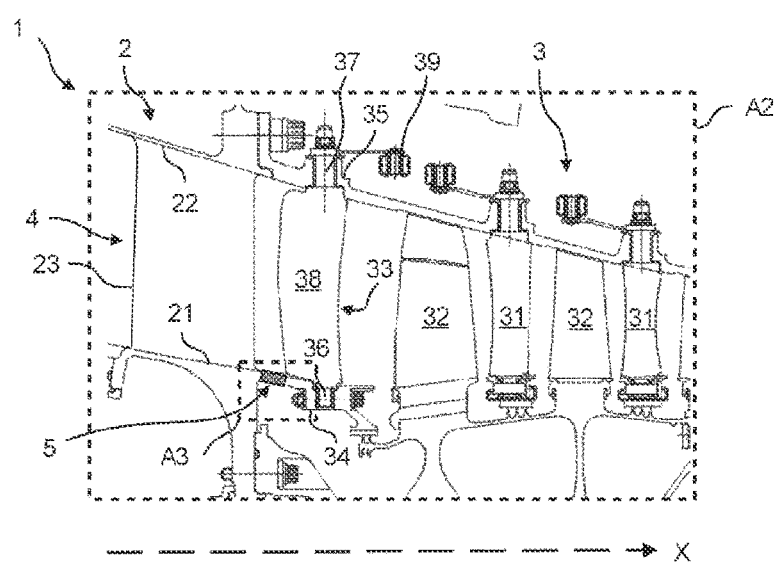
FIG. 4 is a close-up schematic longitudinal half-section representation of the compressor of an aircraft turboshaft engine comprising the blocking device according to the invention.

In a known manner, with reference to FIG. 4 representing a close-up view A2 of FIG. 3, the compressor 1 comprises a low pressure compressor 110 located upstream, a high pressure compressor 3 located downstream and an intermediate casing 2 axially connecting the low pressure compressor 110 and the high pressure compressor 3.

In a known manner, with reference to FIG. 4, the intermediate casing 2 comprises an internal shell 21 internally delimiting the primary vein 4, an external shell 22 externally delimiting the primary vein 4 and support arms 23 extending between the internal shell 21 and the external shell 22.

In a known manner, with reference to FIG. 4, the high pressure compressor 3 comprises alternating stators 31, also called straighteners, and rotors 32 axially mounted along the axis X to respectively guide and accelerate the primary air flow. As previously set forth, the stator located furthest upstream of the high pressure compressor 3 is hereinafter referred to as the inlet guide wheel 33 and is known to the person skilled in the art by its abbreviation "IGW". The high pressure compressor 3 further comprises an external casing 35 externally delimiting the primary vein 4.

In a known manner, with reference to FIG. 4, the inlet guide wheel 33 comprises a fixed retaining annulus 34 of axis X internally delimiting the primary vein 4 and a plurality of vanes 38 mounted between the retaining annulus 34 and the external casing 35 of the high pressure compressor 3. In this example, the retaining annulus 34 and the external casing 35 respectively comprise a plurality of internal recesses 36 and a plurality of external recesses 37, respectively formed at their external periphery, for mounting the vanes 38. In this example, the inlet guide wheel 33 comprises a vane shimming system 39 for adapting the orientation of the vanes 38 depending on the flight conditions.

Figure 5:
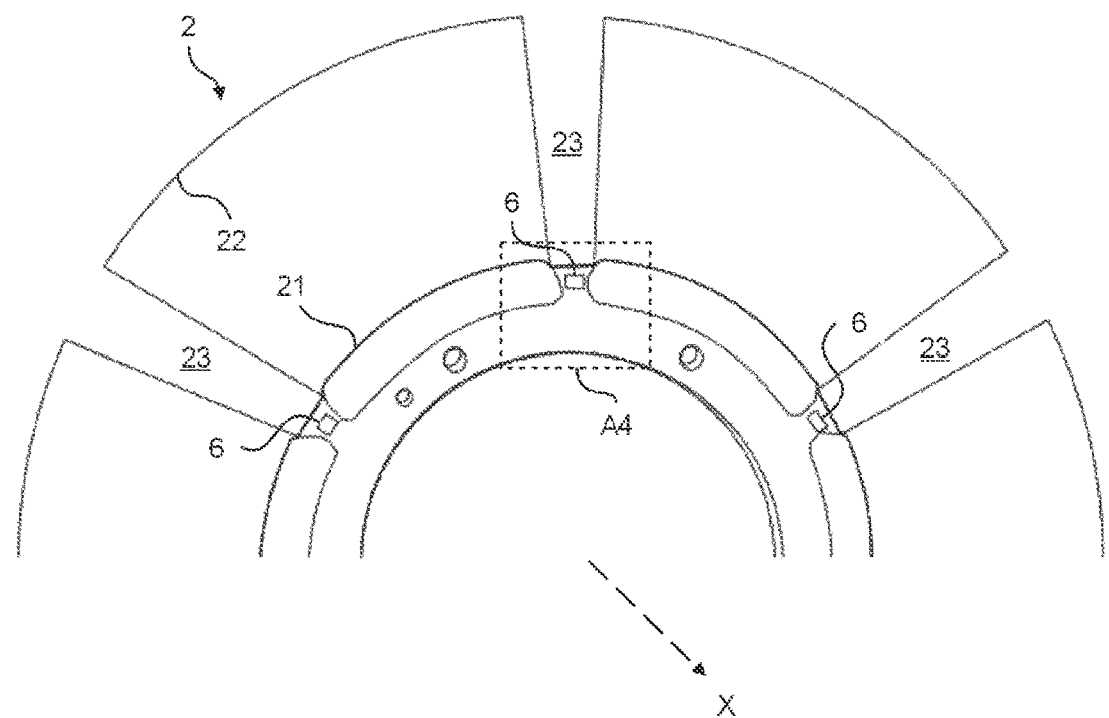
FIG. 5 is a schematic perspective representation from downstream of the internal shell of the intermediate casing.
Figure 6:
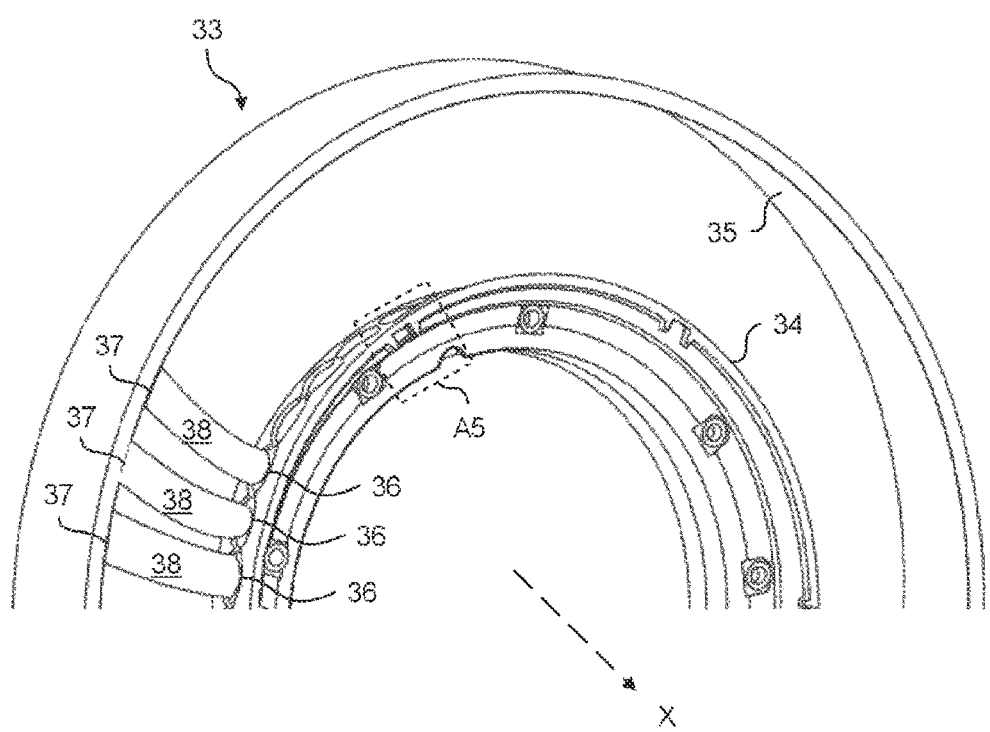
FIG. 6 is a schematic perspective representation of the retaining annulus.

According to the invention, with reference to FIG. 4, the compressor 1 comprises a blocking device 5 between the retaining annulus 34 and the intermediate casing 2. With reference to FIGS. 5 and 6, this blocking device 5 comprises at least one first member 6 integral with the intermediate casing 2 and at least a second member 7 integral with the retaining annulus 34. According to the invention, the second member 7 is configured to cooperate with the first member 6 in order to block a tangential movement of the retaining annulus 34 with respect to the intermediate casing 2 along the axis X while allowing axial movement and radial movement of said retaining annulus 34 with respect to said intermediate casing 2 along the axis X. This tangential blocking advantageously makes it possible, upon ingestion of foreign bodies, such as a bird, to avoid generating a mechanical moment about the axis X on the retaining annulus 34 of the inlet guide wheel 33 that could damage the vanes 38. The radial and axial degrees of freedom, on the other hand, avoid creating a hyperstatic connection between the intermediate casing 2 and the inlet guide wheel 33, and thus preserve the performance of the turboshaft engine 100.

According to one aspect of the invention, as illustrated in FIGS. 5 and 6, the blocking device 5 comprises a plurality of first members 6 and second members 7. Preferably, the blocking device 5 comprises at least three first members 6 to ensure an effective, distributed and redundant tangential blocking. Preferably also, the blocking device 5 comprises at most six first members 6 to limit the overall size, as illustrated in the example of FIG. 5. Similarly, the blocking device 5 comprises at least three second members 7 and at most six second members 7.

Preferably also, the blocking device 5 comprises as many second members 7 as first members 6, as in the example of FIGS. 5 and 6, so that each first member 6 cooperates with a second member 7, two by two. It goes without saying, however, that the number of first members 6 and the number of second members 7 could be different.

The structural characteristics of a first member 6 and a second member 7 are successively described thereafter before describing their cooperation.

In this embodiment, all first members 6 are identical. Therefore, for the sake of clarity and conciseness, only a first member 6 will be described from now on.

Figure 7A:
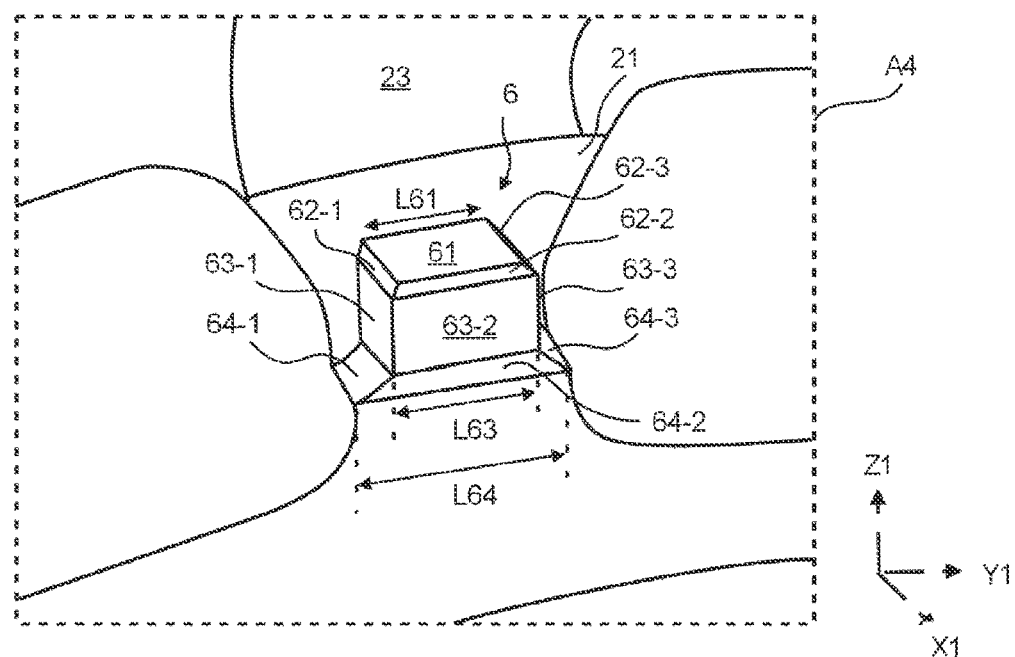
FIG. 7A is a schematic close-up perspective representation of a first member.

According to one aspect of the invention, as represented in FIG. 7A representing a close-up view A4 of FIG. 5, each first member 6 is integral with the internal shell 21 of the intermediate casing 2. In particular, each first member 6 is attached to a downstream part of the internal shell 21.

Figure 7B:
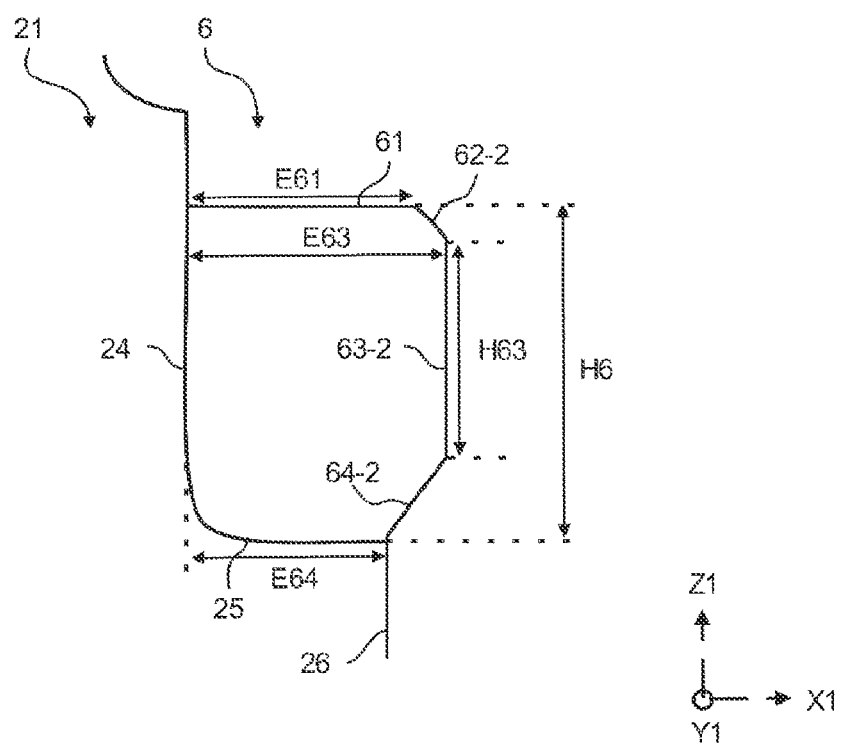
FIG. 7B is a schematic longitudinal cross-section representation of a first member.

With reference to FIG. 7B, the downstream part of the internal shell 21 comprises a first radial wall 24, an internal second radial wall 26 located downstream of the first radial wall 24 and radially internal to said first radial wall 24, and a third axial wall 25 connecting the first radial wall 24 and the second radial wall 26 so as to form a concavity. In this example, the first member 6 is mounted in the concavity and is integral with the first radial wall 24 on the one hand and the third axial wall 25 on the other hand.

As illustrated in FIG. 7B, the first member 6 extends axially protruding downstream with respect to the second radial wall 26. The blocking device 5 is thus located axially between the retaining annulus 34 and the internal shell 21 and has a small overall size.

According to another aspect of the invention, as illustrated in FIGS. 5 and 7A, the first member 6 is located at the same angular position as a support arm 23, to limit the overall size. The walls 24, 25, 26 are not annular but form radial segments which are angularly positioned at the positions of the support arms 23. In the example of FIG. 5, the first six members 6 are thus located at the same angular position as a support arm 23. Advantageously, advantage is taken of the reinforcement of the internal shell 21 at the support arms 23 to form the first members 6. The first members 6 thus have a robust structure as will be set forth later. They can thus absorb any shock or tangential movement of the retaining annulus 34.

It goes without saying, however, that only a part of the first members 6 can be located at the same angular position as a support arm 23, or even that the first members 6 25 could be located at a different angular position depending on the locations available on the internal shell 21.

According to one aspect of the invention, as illustrated in FIGS. 7A and 7B, the first member 6 comprises a downstream face 63-2, located downstream of the first radial downstream wall 24 of the internal shell 21. Preferably, the downstream face 63-2 is parallel to said first radial wall 24. The first member 6 further comprises side faces 63-1, 63-3 connecting the downstream face 63-2 and the first radial wall 24 so that the radial section of the first member 6 is substantially rectangular. The downstream face 63-2 and the side faces 63-1, 63-3 together delimit a median volume, extending axially protruding downstream from the first radial wall 24 and radially protruding outwards from the third axial wall 25. This median volume advantageously allows the creation of a tangential blocking by cooperation with the second member 7, while allowing a radial and axial movement. In particular, the side faces 63-1, 63-3 form tangential stop faces as will be set forth later.

According to another aspect of the invention, as illustrated in FIGS. 7A and 7B, the first member 6 comprises a foot volume that is radially internal to the median volume and a head volume that is radially external to the median volume. In particular, the foot volume is located between the median volume and the third axial wall 25 of the internal shell 21.

Preferably, as illustrated in FIGS. 7A and 7B, the median volume is in the form of a rectangular parallelepiped in the orthogonal plane X1, Y1, Z1, where X1 refers to the axial direction parallel to the axis X, Y1 to the tangential direction with respect to the axis X and Z1 to the radial direction with respect to the axis X. Preferably, the radial height H63 of the median volume is large enough for optimal cooperation between the first member 6 and the second member 7 and small enough to limit the overall size. Similarly, the tangential length L63 and/or the axial thickness E63 are large enough for optimal cooperation between the first member 6 and the second member 7 and small enough to limit the overall size.

As illustrated in FIGS. 7A and 7B, the first member 6 comprises a foot downstream face 64-2 connecting the downstream face 63-2 and the second radial wall 26 as well as two foot side faces 64-1, 64-3 connecting the side faces 63-1, 63-3 and the third axial wall 25. The foot downstream face 64-2 and the foot side faces 64-1, 64-3 together define the foot volume, in cooperation with the first radial wall 24 and the third axial wall 25.

Preferably, the tangential foot length L64 separating the two foot side faces 64-1, 64-3 at the axial downstream wall 25 is greater than the tangential length L63, so that the foot volume has a large contact section with the third axial wall 25, thereby improving the mechanical shear strength. In other words, the foot side faces 64-1, 64-3 are oblique to the radial direction Z1 forming bevels in the foot volume. These bevels have the advantage of avoiding forming a right angle between the side faces 63-1, 63-3 and the foot side faces 64-1, 64-3, thus avoiding the appearance of local cracks and microcracks.

Preferably also, the foot axial thickness E64 separating the foot downstream face 64-2 from the first radial downstream wall 24 at the radial downstream wall 25 is less than the axial thickness E63, so that the median volume extends axially protruding downstream. In other words, the foot downstream face 64-2 is oblique with respect to the radial direction Z1, so as to avoid forming a right angle between the downstream face 63-2 and the foot downstream face 64-2, thus avoiding the appearance of local cracks and microcracks.

As illustrated in FIGS. 7A and 7B, the first member 6 further comprises an external face 61, a head downstream face 62-2 connecting the downstream face 63-2 and the external face 61, and two head side faces 62-1, 62-3 connecting the side faces 63-1, 63-3 and the external face 61. The external face 61, the head downstream face 63-2 and the head side faces 63-1, 63-3 together delimit the head volume, in cooperation with the first radial wall 24.

Preferably, the section of the head volume of the first member 6 is smaller than that of the median volume so as to facilitate cooperation with the second member 7, in particular, during relative movements along the radial direction. In this example, the tangential head length L61 of the external face 61 is smaller than the tangential length L63. In other words, the head side faces 62-1, 62-3 are oblique with respect to the radial direction Z1 forming bevels in the head volume. These bevels have the advantage of facilitating cooperation between the first member 6 and the second member 7 as well as avoiding forming a right angle between the side faces 63-1, 63-3 and the head side faces 62-1, 62-3, thus avoiding the appearance of cracks and local microcracks.

Preferably also, the head axial thickness E61 of the external face 61 is less than the axial thickness E63, so that the median volume extends axially protruding downstream.

In other words, the head downstream face 62-2 is oblique with respect to the radial direction Z1.

According to a preferred aspect of the invention, each first member 6 forms a one-piece assembly with the internal shell 21 of the intermediate casing 2. In other words, each first member 6 is made of the material of the internal shell 21 of the intermediate casing 2, which provides the first member 6 increased mechanical strength. It goes without saying, however, that the first member 6 could be independent of the intermediate casing 2 and mounted as an insert. The first member 6 could also be made of a different material from that of the intermediate casing 2.

The structural characteristics of the second member 7 are described below before describing its cooperation with the first member 6.

Figure 8:
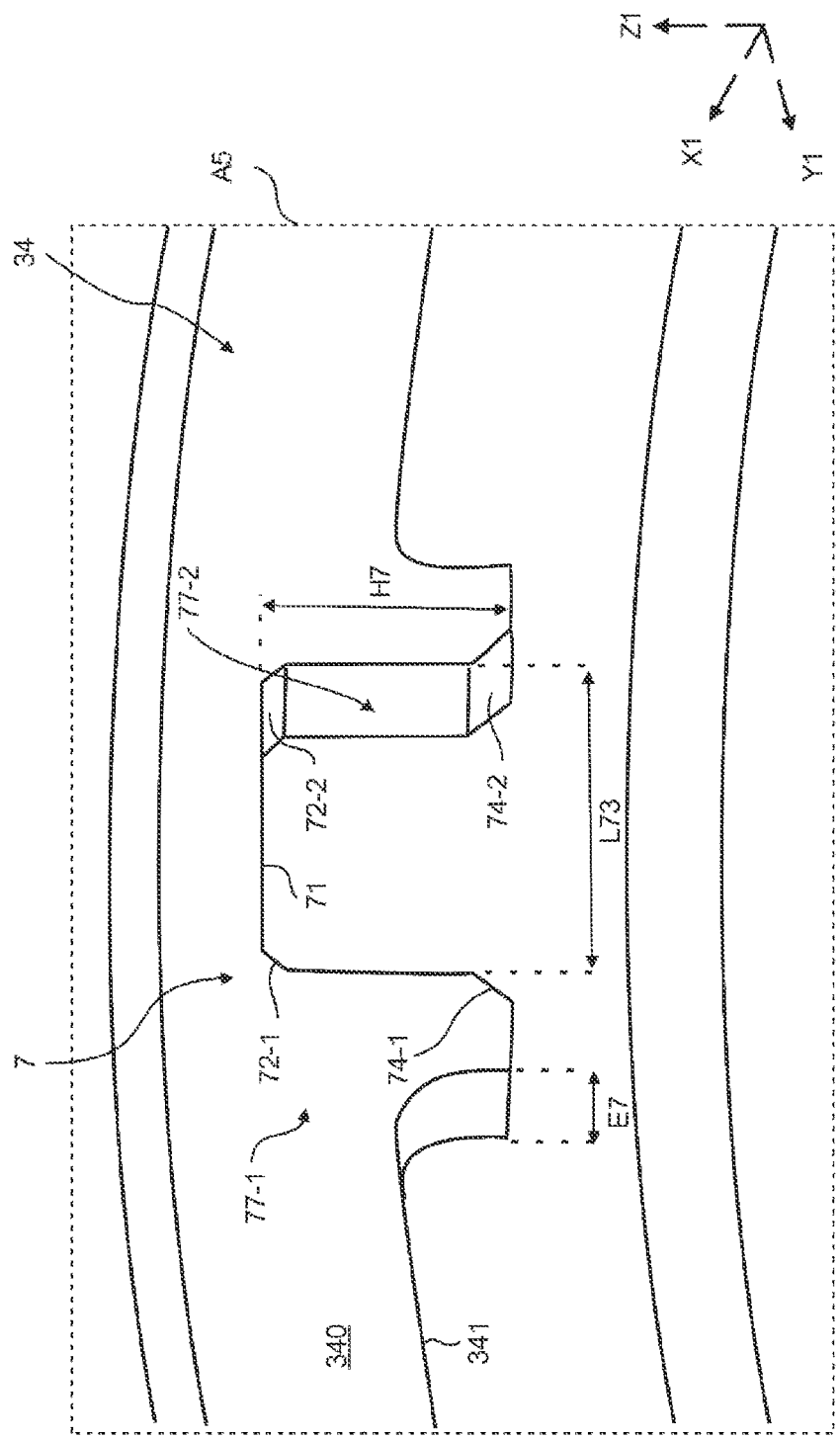
FIG. 8 is a close-up schematic representation of a second member.

According to a first embodiment, with reference to FIG. 8 representing a close-up view A5 of FIG. 6, the second member extends in a plane transverse to the axis X. Preferably, the second member 7 has a U-shape defining two side branches 77-1, 77-2 and a base 71. The concavity of the U is radially inwardly oriented so as to allow the retaining annulus 34 to expand radially outwards due to thermal conditions.

As represented in FIG. 8, the retaining annulus 34 comprises an upstream annular ring 340 and the second member 7 is formed in the upstream annular ring 340. The upstream annular ring 340 extends transversely to the axis X as illustrated in FIG. 8. According to this embodiment, the second member 7 is in the form of a housing formed in the upstream annular ring 340. Preferably, the legs 77-1, 77-2 extend protruding from the internal edge 341 of the upstream annular ring 340 to facilitate cooperation with the first member 6 and improve tangential blocking.

In this example, the second member 7 forms a one-piece assembly with the retaining annulus 34. In other words, the second member 7 is made of the material of the retaining annulus 34, which provides the second member 7 increased mechanical strength. It goes without saying that the second member 7 could be independent of the retaining annulus 34. The second member 7 could also be of a different material from that of the retaining annulus 34.

Figure 9A:
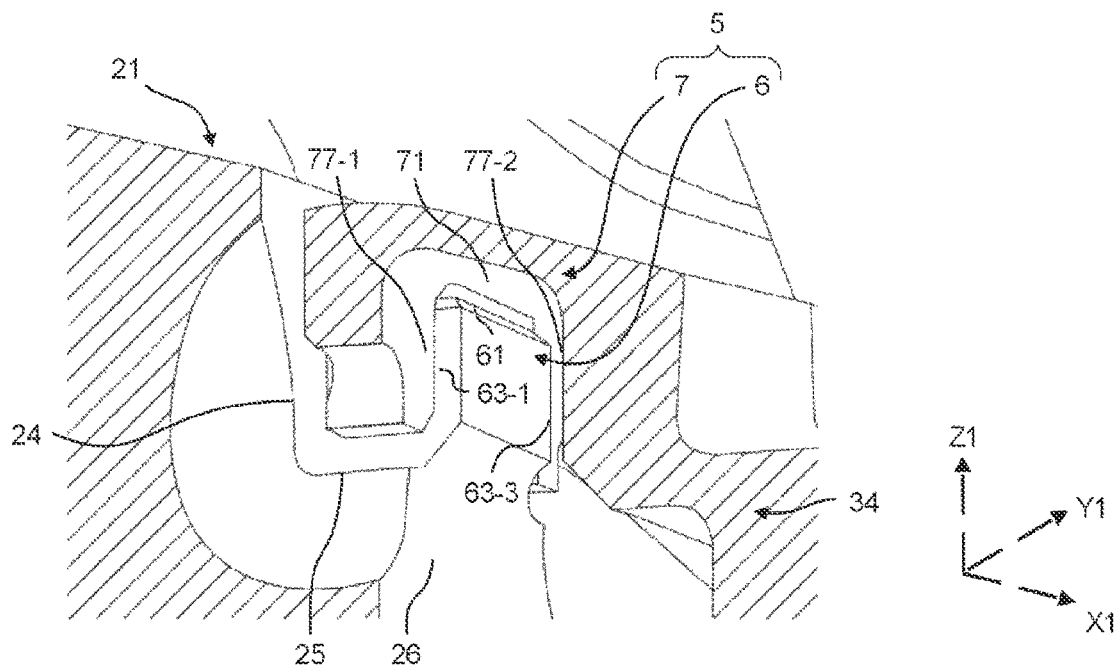
FIG. 9A is a schematic perspective representation of a first member and a second member in cooperation.

As illustrated in FIG. 9A, the second member 7 is configured to receive the first member 6 by interlocking the first member 6 into the housing formed by the second member 7. In other words, the base 71 is configured to cooperate with the external face 61 of the first member 6. Furthermore, the side branches 77-1, 77-2 of the second member 7 are configured to cooperate with the side faces 63-1, 63-3 of the first member 6 so as to block any tangential movement. Conversely, the retaining annulus 34 is free to expand radially and move axially with respect to the internal shell 21 of the intermediate casing 2. Advantageously, there is no hyperstatic connection.

Preferably, as illustrated in FIGS. 8 and 9A, the second member 7 has a total radial height H7 substantially equal to the total radial height H6 of the first member 6. Furthermore, the second member 7 has a tangential width L73 defined as the tangential length separating the two legs 77-1, 77-2 substantially equal to the tangential length L63 of the first member 6. Furthermore, the second member 7 has an axial thickness E7 preferably less than the axial thickness E63 of the first member 6, preferably equal to the foot axial thickness E64 of the first member 6, so as to allow total interlocking in the axial direction X1 of the first member 6 with the second member 7. Such an interlocking connection is also known as a dog connection.

Preferably, as illustrated in FIGS. 8 and 9A, the second member 7 comprises beveled faces 72-1, 72-2 connecting the base 71 to the side legs 77-1, 77-2, configured to cooperate with the head side faces 62-1, 62-3 of the first member 6. This thus allows radial centering of the first member 6 relative to the second member 7 during radial movements.

Preferably also, the second member 7 comprises beveled faces 74-1, 74-2 at the internal end of the legs 77-1, 77-2 which are configured to cooperate with the foot side faces 64-1, 64-3 of the first member 6.

Figure 9B:
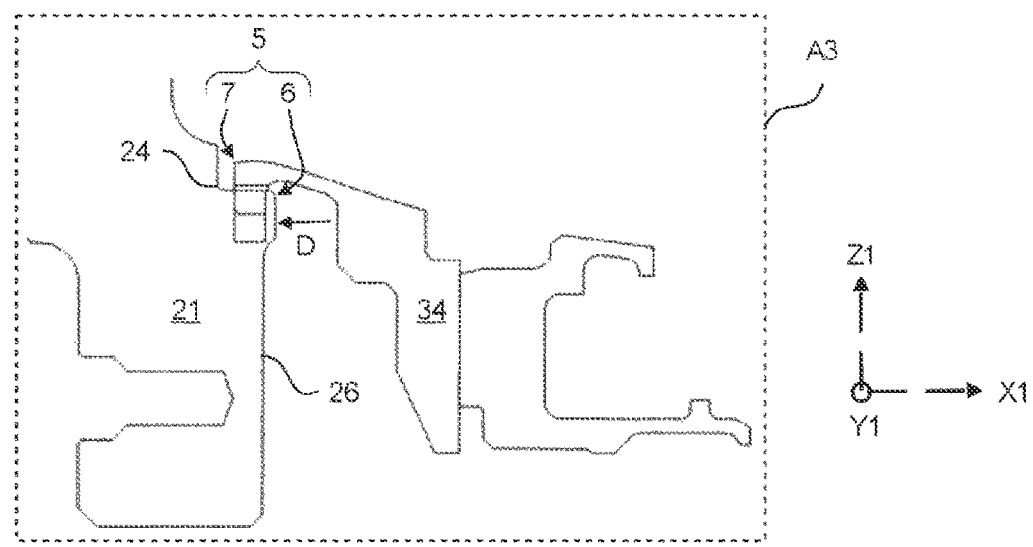
FIG. 9B is a close-up schematic longitudinal cross-section representation of a first member and a second member in cooperation.

With reference to FIG. 9B representing a close-up view A3 of FIG. 4, to mount the previously set forth compressor 1, the inlet guide wheel 33 of the high pressure compressor 3 is axially mounted to the intermediate casing 2 such that each first member 6 is axially inserted by axial movement D into each second member 7 between the legs 77-1, 77-2. As a result of the mounting, the retaining annulus 34 is prevented from rotating about the axis X but remains free to move axially along the axis X or to expand radially.

In case of ingestion of a foreign body, such as a bird, the latter may strike the retaining annulus 34, which transmits mechanical loads to the internal shell 21 by virtue of the blocking device 5. In other words, the retaining annulus 34 does not move tangentially, thus avoiding any loss of vane 38.

Figure 10A:
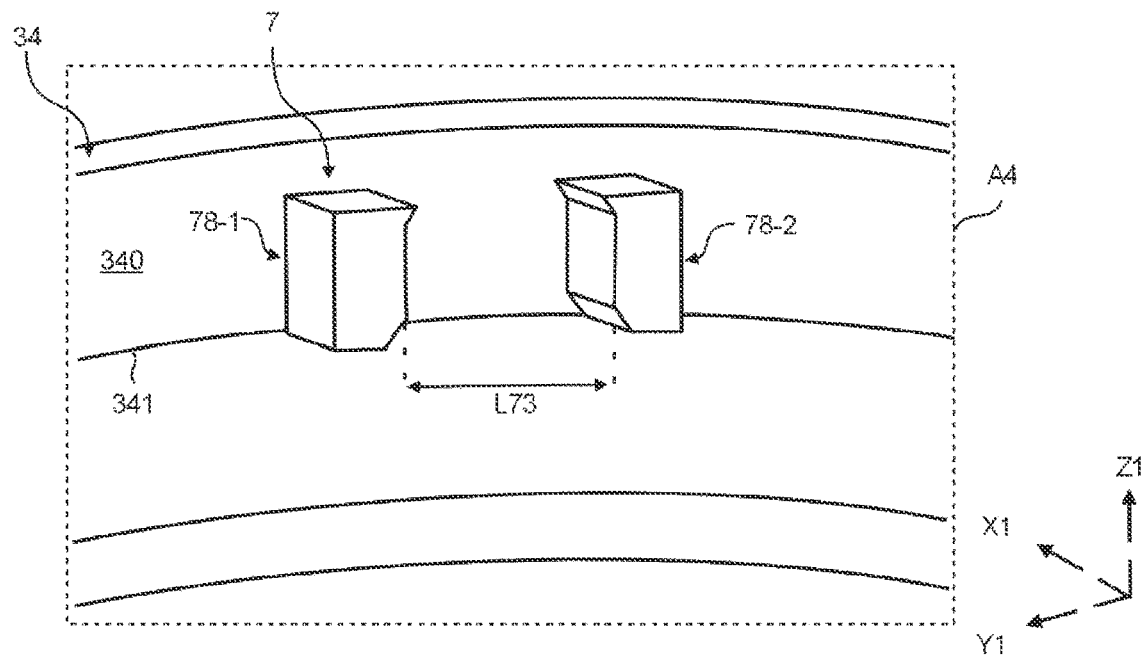
FIG. 10A.
Figure 10B:
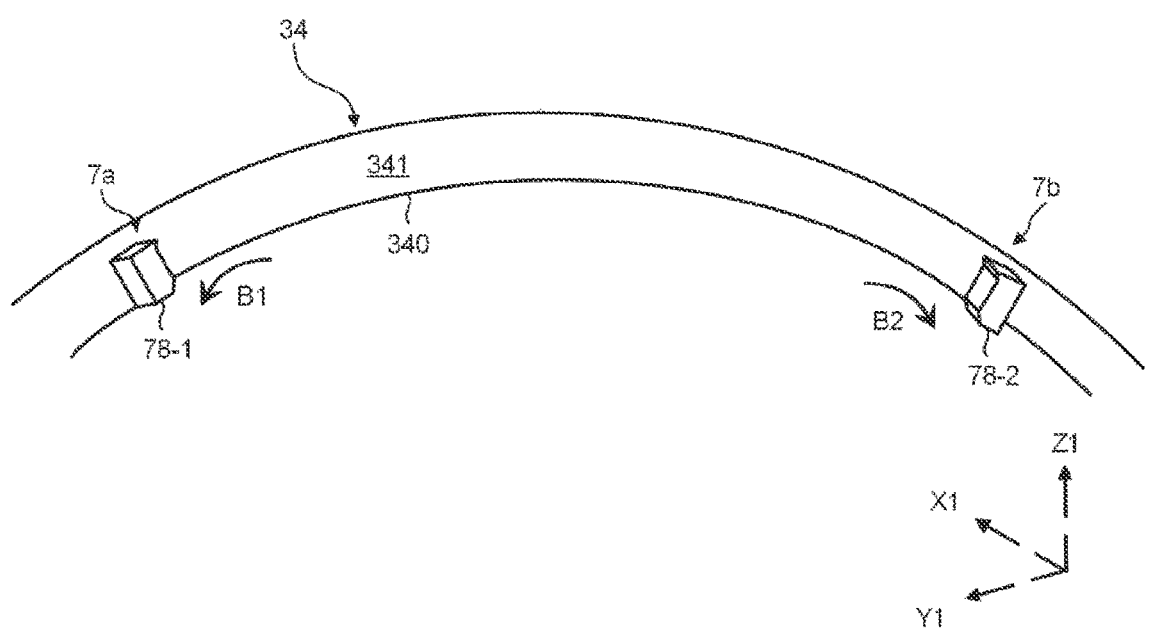
FIG. 10B are schematic perspective representations of a second member according to a second and third embodiment respectively of the blocking device according to the invention.

Two further embodiments of the second member 7 are described hereafter with reference to FIGS. 10A and 10B.

According to another embodiment of the invention, as illustrated in FIG. 10A, the second member 7 comprises two portions 78-1, 78-2 extending axially protruding upstream from the retaining annulus 34, in particular, from the upstream annular ring 340. Preferably also, the portions 78-1, 78-2 are separated from each other at least by the tangential length L73. In other words, the tangential space formed between portions 78-1, 78-2 defines a housing for receiving the first member 6.

According to one aspect of the invention, the two portions 78-1, 78-2 are configured to extend on either side tangentially from the first member 6, so as to form a tangential stop for the first member 6 in each direction of rotation about the axis X (bidirectional stop).

According to another embodiment of the invention, the second member 7 comprises a single portion 78-1, 78-2, configured to extend tangentially from a single side of the first member 6. This second member 7 thus forms a unidirectional tangential stop for the first member 6, the first member 6 being tangentially blocked along a single direction of rotation. As illustrated in FIG. 10B, the blocking device 5 comprises at least two second members 7 to allow bidirectional tangential blocking. As illustrated in FIG. 10B, a second member 7a is configured to halt a motion along the first direction of rotation B1 by cooperation with a first member 6 (not represented). Another second member 7b is configured to halt a motion along the second direction of rotation B2 by cooperation with another first member 6 (not represented). Blocking is thus bidirectional.

By virtue of the blocking device of the compressor according to the invention, the vanes 38 of the inlet guide wheel 33 are protected upon ingestion of foreign bodies into the compressor 1. More precisely, the blocking device 5 tangentially blocks the inlet guide wheel 33 with respect to the intermediate casing 2, which makes it possible to avoid the appearance of a mechanical moment about the axis X when the foreign body strikes the inlet guide wheel 33. This blocking device 5 is also space-saving and does not require any changes to the overall structure of the inlet guide wheel 33 and the intermediate casing 2. The existing assembly line of the inlet guide wheel 33 and the intermediate casing 2 can therefore advantageously be kept. Furthermore, the blocking device 5 allows an axial and radial movement of the inlet guide wheel 33 with respect to the intermediate casing 2, so that the performance of the turboshaft engine 100 is not reduced by friction.

The invention claimed is:

1. A compressor for an aircraft dual-flow turboshaft engine longitudinally extending along an axis X oriented from upstream to downstream, said compressor comprising: a low pressure compressor located upstream of a high pressure compressor and an intermediate casing axially connecting the low pressure compressor and the high pressure compressor, a primary vein in which a primary air flow accelerated by said compressor circulates from upstream to downstream, said high pressure compressor comprising an inlet guide wheel comprising a retaining annulus internally delimiting the primary vein, an external high pressure compressor casing externally delimiting said primary vein and a plurality of vanes extending into said primary vein between the retaining annulus and the external high pressure compressor casing, the intermediate casing comprising an internal shell internally delimiting the primary vein and an external shell externally delimiting said primary vein and connected to the external high pressure compressor casing, the intermediate casing comprising a plurality of support arms extending into the primary vein and connecting the internal shell and the external shell, and a blocking device, said blocking device comprising:
at least a first member integral with the internal shell of the intermediate casing and located at a same angular position as at least one of the plurality of support arms with respect to the axis X, and
at least a second member integral with the retaining annulus, the at least one second member:
having a U-shape defining two side legs and a base, and a concavity of the U-shape being radially inwardly oriented, or
comprising at least one upstream protruding portion from the retaining annulus which is tangentially offset from the first member and configured to form a tangential stop,
so as to be configured to cooperate with the first member in order to block a tangential movement of the retaining annulus with respect to the intermediate casing along the axis X while allowing axial movement and radial movement of said retaining annulus with respect to said intermediate casing along the axis X.

2. The compressor according to claim 1, wherein, with the internal shell comprising a downstream part which comprises a first radial wall, an internal second radial wall located downstream of the first radial wall and radially internal to said first radial wall, and a third axial wall connecting the first radial wall and the second radial wall, the first radial wall and the third axial wall together form a concavity in which the first member is mounted.

3. The compressor according to claim 1, wherein the first member longitudinally protrudes downstream along the axis X.

4. The compressor according to claim 1, wherein the second member is in the form of a housing extending axially downstream in the retaining annulus and configured to receive the first member.

5. The compressor according to claim 1, wherein the first member comprises a median volume defining two side faces configured to form tangential stop faces with the second member.

6. The compressor according to claim 1, wherein the retaining annulus comprises an upstream annular ring, the second member is formed in the upstream annular ring.

7. The compressor according to claim 1, wherein the first member and the internal shell form a one-piece assembly.

8. The compressor according to claim 1, comprising a plurality of first members.

9. A method for mounting a compressor for an aircraft dual-flow turboshaft engine longitudinally extending along an axis X oriented from upstream to downstream, said compressor comprising a low pressure compressor located upstream of a high pressure compressor and an intermediate casing axially connecting the low pressure compressor and the high pressure compressor, a primary vein in which a primary air flow accelerated by said compressor circulates from upstream to downstream, said high pressure compressor comprising an inlet guide wheel comprising a retaining annulus internally delimiting the primary vein, an external high pressure compressor casing externally delimiting said primary vein and a plurality of vanes extending into said primary vein between the retaining annulus and the external high pressure compressor casing, the intermediate casing comprising an internal shell internally delimiting the primary vein and an external shell externally delimiting said primary vein and connected to the external high pressure compressor casing, the intermediate casing comprising a plurality of support arms extending into the primary vein and connecting the internal shell and the external shell, and a blocking device said blocking device comprising:
at least a first member integral with the internal shell of the intermediate casing and located at a same angular position as at least one of the plurality of support arms with respect to the axis X, and
at least a second member integral with the retaining annulus, wherein the retaining annulus is axially mounted to the intermediate casing, the at least one second member:
having a U-shape defining two side legs and a base, and wherein a concavity of the U-shape being radially inwardly oriented, or
comprising at least one upstream protruding portion from the retaining annulus which is tangentially offset from the first member and configured to form a tangential stop,
such that the first member and the second member cooperate so as to block tangential movement of the retaining annulus with respect to the intermediate casing along the axis X while allowing axial movement and radial movement of said retaining annulus with respect to said intermediate casing along the axis X.

10. A compressor for an aircraft turboshaft engine that longitudinally extends along an axis X and oriented from upstream to downstream, said compressor comprising:
a low pressure compressor located upstream of a high pressure compressor and an intermediate casing axially connecting the low pressure compressor and the high pressure compressor;
a primary vein in which a primary air flow accelerated by said compressor circulates from upstream to downstream;
said high pressure compressor comprising an inlet guide wheel comprising a retaining annulus internally delimiting the primary vein;

an external high pressure compressor casing externally delimiting said primary vein and a plurality of vanes extending into said primary vein between the retaining annulus and the external high pressure compressor casing;

the intermediate casing comprising an internal shell internally delimiting the primary vein and an external shell externally delimiting said primary vein and connected to the external high pressure compressor casing;

the intermediate casing comprising a plurality of support arms extending into the primary vein and connecting the internal shell and the external shell; and a blocking device, said blocking device comprising:
 a first member comprising a plurality of faces and being integral with the internal shell of the intermediate casing and located at a same angular position as at least one of the plurality of support arms with respect to the axis X; and
 a second member having a base, the second member being integral with the retaining annulus and positioned to cooperate with the first member to block a tangential movement of the retaining annulus with respect to the intermediate casing along the axis X.

11. The compressor according to claim 10, wherein the second member has a U-shape defining two side legs and the base, and wherein a concavity of the U-shape being radially inwardly oriented.

12. The compressor according to claim 10, wherein the second member comprises an upstream protruding portion configured to form a tangential stop.

13. The compressor according to claim 12, wherein the upstream protruding portion is tangentially offset from the first member.

14. The compressor according to claim 10, wherein the first member longitudinally protrudes downstream along the axis X.

15. The compressor according to claim 10, wherein the first member comprises two side faces configured to form tangential stop faces with the second member.

16. The compressor according to claim 10, wherein the retaining annulus comprises an upstream annular ring, the second member is formed in the upstream annular ring.

17. The compressor according to claim 10, wherein the first member and the internal shell form a one-piece assembly.

18. The compressor according to claim 10, further comprising a plurality of first members.

19. The compressor according to claim 18, further comprising a plurality of second members.

* * * * *